(12) United States Patent
Forslund (10) Patent No.: US 7,849,761 B2
(45) Date of Patent: Dec. 14, 2010

(54) WRIST UNIT TO A ROBOT ARM

(75) Inventor: Karl-Erik Forslund, Västerås (SE); Catarina Forssén, legal representative, Västerås (SE)

(73) Assignee: ABB AB, Västerås (SE)

(*) Notice: Subject to any disclaimer, the term of this patent is extended or adjusted under 35 U.S.C. 154(b) by 1210 days.

(21) Appl. No.: 10/583,665

(22) PCT Filed: Dec. 22, 2004

(86) PCT No.: PCT/SE2004/002004

§ 371 (c)(1),
(2), (4) Date: Jun. 21, 2006

(87) PCT Pub. No.: WO2005/061189

PCT Pub. Date: Jul. 7, 2005

(65) Prior Publication Data

US 2009/0139364 A1    Jun. 4, 2009

(30) Foreign Application Priority Data

Dec. 22, 2003 (SE) .................................. 0303539

(51) Int. Cl.
*B25J 17/00* (2006.01)

(52) U.S. Cl. .................. 74/490.06; 74/490.05; 901/29; 414/8

(58) Field of Classification Search ........... 74/49.01, 74/490.02, 490.03, 490.04, 490.05, 490.06; 414/8; 901/15, 29, 28, 1, 2
See application file for complete search history.

(56) References Cited

U.S. PATENT DOCUMENTS

| | | | |
|---|---|---|---|
| 4,151,390 A | 4/1979 | Bisiach | |
| 4,642,021 A | 2/1987 | Kikuchi | |
| 4,846,015 A | 7/1989 | Keppler et al. | |
| 5,225,648 A * | 7/1993 | Torii et al. | 219/121.6 |
| 5,279,177 A | 1/1994 | Inada | |
| 5,816,108 A * | 10/1998 | Obata et al. | 74/490.05 |
| 5,894,761 A | 4/1999 | Danielsson et al. | |
| 5,924,330 A | 7/1999 | Danielsson et al. | |
| 6,455,799 B1 | 9/2002 | Forslund et al. | |
| 6,795,750 B2 * | 9/2004 | Kullborg | 700/245 |

(Continued)

FOREIGN PATENT DOCUMENTS

EP    0648 583 A1    4/1995

(Continued)

OTHER PUBLICATIONS

PCT/ISA/201/SE—International Search Report—Jul. 21, 2004.

*Primary Examiner*—David M Fenstermacher
(74) *Attorney, Agent, or Firm*—Venable LLP; Eric J. Franklin (57) ABSTRACT

A wrist unit to be arranged in an industrial robot including a control system and a manipulator. The manipulator includes a robot arm and a wrist unit arranged on the robot arm and including a wrist housing arranged for rotation about a fourth axis of rotation, a wrist part/tilt pivotally journalled in the wrist housing for rotation about a fifth axis of rotation. A second transmission is configured to transmit rotation form a second drive unit to the turn disc about the sixth axis of rotation where the control system controls the first and second drive units.

12 Claims, 9 Drawing Sheets

U.S. PATENT DOCUMENTS 6,811,124 B2 * 11/2004 Karlinger .................... 248/49
2006/0182608 A1 * 8/2006 Kinoshita et al. ........ 414/744.5
2009/0249915 A1 * 10/2009 Iwai et al. ................ 74/490.02

FOREIGN PATENT DOCUMENTS

| EP | 1 352 720 A1 | 10/2003 |
| SE | 508735 C2 | 7/1996 |
| WO | WO 2005/061189 A1 | 7/2005 |

* cited by examiner

WRIST UNIT TO A ROBOT ARM

CROSS-REFERENCE TO RELATED APPLICATIONS

This application claims priority to Swedish patent application 0303539-1 filed 22 Dec. 2003 and is the national phase under 35 U.S.C. §371 of PCT/SE2004/002004.

TECHNICAL FIELD

The present invention relates to a wrist unit for an industrial robot, comprising a wrist housing which is intended to be detachably fixed to an outer end of a robot arm. In a wrist housing, a tilt is pivotally journalled and, in its turn, supports a rotatably journalled turn disc on which an external tool is mounted.

BACKGROUND ART

When designing industrial robots, it is common to arrange the cabling, necessary for the robot, internally in the robot. For welding robots, it is equally common for the cabling to be drawn outside of the upper arm of the robot to an offset welding gun. This results in a space-demanding arrangement. When externally drawn cabling is used, there is always a risk of the cabling being hooked onto, for example, a workpiece, such as a car body. The risk of hooking is especially great if the cabling runs freely outside the wrist of the robot up to the tool.

In the case of both external and internal cabling, there are problems with deformation and torsion of cables and wires. Problems arise particularly when the robot is to be able to bend the wrist more than 90°. Cables, for example for electric power to welding electrodes, power supply to tools and robot, electric signal cables for transmission of information from sensors at the welding head, hoses for compressed air and coolant and so on, are to be able to manage the necessary bending while at the same time rotating in spite of the fact that they provide considerable resistance to such bending and rotation.

When positioning the work tool of an industrial robot, problems arise when the cabling is drawn externally. The fast movements of the robot cause externally arranged cabling to swing around the upper arm of the robot, resulting in a deterioration of the operating accuracy of the robot. The solution so far has been to control the speed and hence reduce the speed of the robot, for example before welding operations, to reduce the unwanted movements of the cabling and hence attempt to maintain an acceptable welding accuracy.

The determination cabling here relates to process cabling, which may be surrounded by a casing for, for example welding electrodes, power supply for the actual tool, and power supply to the robot. In addition, the determination comprises spare circuits for, for example, the various needs of the customer.

Figure 8:
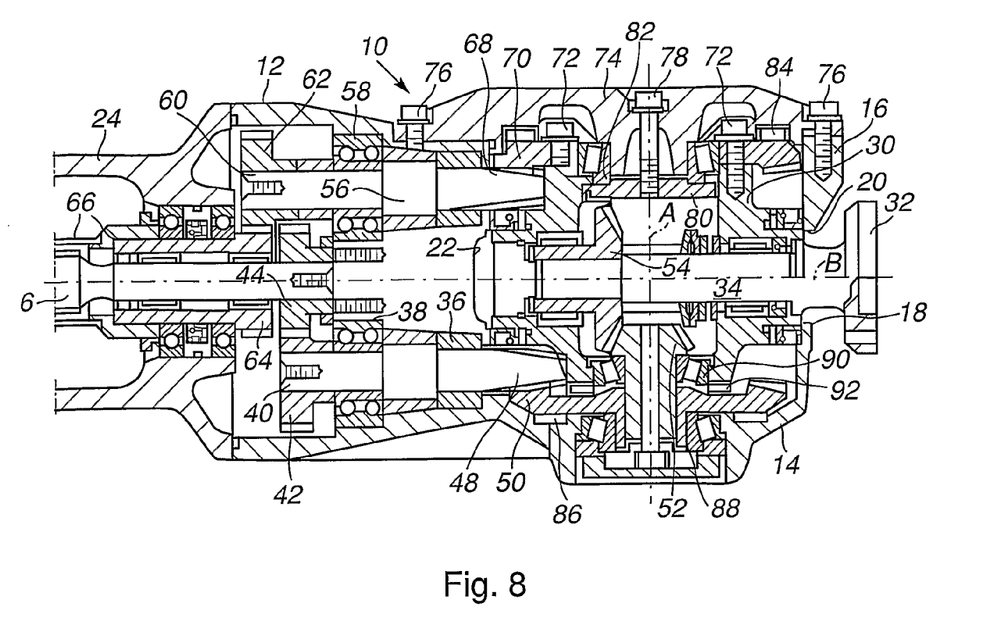
FIG. 8 is the prior art.

The patent document SE 508 735 (FIG. 7) shows a wrist unit for an industrial robot. The wrist comprises a wrist housing that is detachably fixed to the external end of the upper arm of the robot. The wrist housing has a fork-like portion which supports a pivotally journalled tilt housing, which in turn supports a rotatably journalled turn disc on which an external work tool is mounted. A first and a second secondary drive shaft are arranged in parallel and rotatably journalled in the wrist housing. Cylindrical gear wheels are mounted on the input end of each respective secondary drive shaft for engagement with a corresponding cylindrical gear drive on each respective primary drive shaft in the robot arm. The centre axes of the cylindrical gear wheels lie on the same side of an axial centre through the cylindrical gear drives. This makes it possible for the wrist housing to be radially adjustable and capable of being fixed on the end of the robot arm, whereby gear backlash between the cylindrical gear drives and their respective gear wheels on the secondary drive shafts may be adjusted in a simple manner.

The patent document U.S. Pat. No. 5,279,177 shows a wrist unit arranged on the outer end of a robot arm in an industrial robot. The wrist unit comprises a rotatably arranged turn disc, which supports a robot tool. The object is to arrange a wrist unit with a relatively large through-opening intended to pass cabling drawn through the opening. The wrist comprises a first cylinder that constitutes a coaxial extension of the robot arm, which cylinder is arranged to be rotatable about its longitudinal axis and constitutes a first wrist axis. A second cylinder is coaxially arranged inside the first cylinder and is further rotatably arranged for rotation both around the first wrist axis and in relation to the first cylinder. A first gear wheel is fixedly arranged at one end of the second cylinder for rotation about the first wrist axis. A drive shaft is arranged with an axis of rotation in parallel with the first wrist axis and rotatably supported by the first cylinder. A second gear wheel is arranged on one end of the drive shaft for engagement with the first gear wheel. The second conical gear wheel is rotatably supported by the first cylinder for rotation about a second axis of rotation. The second axis of rotation intersects both the first axis of rotation and a cylindrical portion secured to the second conical gear wheel for rotational movement about the second axis of rotation. The object of the invention is to be able, in a robot for spray painting, to pull the hose for paint supply to the spray tool internally of the wrist, hence shortening the distance between the spraying tool and a colour-change valve. The problem is that the hose between the valve and the tool must be cleaned when changing colour and hence it is desirable for the distance between them to be as short as possible. In addition, this enables the robot tool to assume any inclination in any position.

U.S. Pat. No. 6,455,799 shows a robot arranged with a rotatable hollow arm part, a robot unit rotatable about a centre axis, and cabling drawn through the arm part and connected to the robot unit. The cabling is fixed in a controlling supporting member arranged inside the arm part. The bending movement is absorbed in that part of the cabling which is situated between the supporting member and the robot unit and the rotational movement is absorbed by that part of the cabling which is situated inside the arm part. A torque transmitter transmits the rotation to the supporting member from the robot unit, which in one embodiment is in the form of a turn disc supporting the robot tool.

When manufacturing industrial robots which are expected to manage fast movements in relatively narrow spaces and which at the same time are expected to manage to carry out operations with high accuracy, a need arises of arranging the cabling in a protected manner inside the robot and up to the tool in a way that enables fast and accurate movements of the robot tool. One problem that has existed for a long time is that an operator cannot simulate cables in an offline environment. Cabling drawn outside a robot renders offline programming impossible, since it is impossible to simulate the swinging movements of the cabling arranged outside a robot when a robot is moving. In addition, there is the need for the robot to be space-saving, and then particularly in the wrist which supports the tool and is to enter into narrow spaces. To this is to be added the need felt by the robot user for a flexible robot design that facilitates exchange of robot applications.

This need cannot be fulfilled by any of the industrial robots disclosed in the documents cited.

SUMMARY OF THE INVENTION

It is an object of the present invention to provide a space-saving wrist for an industrial robot. It is a further object to enable the necessary cabling of the robot to be configured to extend internally through the wrist. The intention is to make possible simulation capacity during offline programming and, in addition, to provide faster and more accurate movements of the robot. Further, it is an object to make possible larger mobility across the tilt, good accessibility for the robot and, at the same time, to eliminate undesired movements of the cabling upon fast movements of the robot. In addition, it is an object to make possible simple replacement of wrist and cabling, respectively.

The solution according to the invention is, according to a first aspect, to provide a wrist unit and an industrial robot, and, according to a second aspect, by a method for controlling an industrial robot.

The solution according to the first aspect of the invention is to provide a wrist unit intended to be connected to a robot arm in an industrial robot. The wrist unit comprises a wrist housing, a wrist part/tilt pivotally journalled in the wrist housing for rotation about an axis of rotation E and a turn disc rotatably journalled on the wrist part/the tilt for rotation about an axis of rotation F. The axis of rotation E is adapted to cross the axis of rotation F. Further, the wrist housing comprises a first transmission configured to transmit rotation about axis of rotation E to the wrist part/the tilt, and a second transmission configured to transmit rotation about axis of rotation F to the turn disc. The second transmission comprises a first drive-shaft tube arranged symmetrically along the symmetry axis of the wrist housing. The first drive-shaft tube is configured to form a continuous channel which is configured to receive and house continuous cabling.

The wrist unit according to the invention permits a mobility across the tilt of about +/−70 degrees as compared with the previous about +/−60 degrees.

The inventive concept assumes that the wrist has three axes. Further, it is part of the inventive concept that the wrist is included in an optional industrial robot with at least one axis, which corresponds to the fourth axis of rotation D in the embodiment mentioned. The solution according to the invention permits the swinging and oscillation of cabling to take place behind the arm housing as viewed from the robot tool.

The invention enables offline programming remotely from the robot and also remotely from the customer through the simulation capacity according to the above.

According to an alternative embodiment of the invention, the wrist unit comprises at least one drive means for driving one of the transmissions. In a further alternative embodiment, the wrist unit comprises two drive means, one for each transmission. The drive means are preferably arranged in that part of the wrist unit which is located nearest the connection to the robot arm.

It is part of the inventive concept that the wrist unit is intended to constitute part of a modularized industrial robot. In an advantageous embodiment, the drive means which drive the respective transmission and the necessary bevel gear pairs are arranged outside and/or inside the robot arm. In this way, the invention makes it possible to arrange a wrist unit with a comparatively low weight and, in addition, with a comparatively small physical extent in length, that is, a "shorter" wrist.

In this way, the invention makes possible a modularized robot arm where a comparatively small and light wrist unit is easily replaceable.

According to the first aspect of the invention, the solution is also to provide an industrial robot with a control system and a manipulator comprising a robot arm and an inventive wrist unit arranged on the robot arm. A wrist housing is arranged for rotation about an axis of rotation D, a wrist part/tilt is pivotally journalled in the wrist housing for rotation about an axis of rotation E, and a turn disc rotatably journalled on the wrist part/the tilt is arranged for rotation about an axis of rotation F. The axis of rotation F is configured to cross the axis of rotation E. Further, the wrist housing comprises a first transmission configured to transmit rotation from a first drive unit to the turn disc for rotation about the axis of rotation E, and a second transmission configured to transmit rotation from a second drive unit to the turn disc for rotation about the sixth axis of rotation. The first transmission comprises a drive-shaft tube arranged symmetrically along the axis of rotation D. The drive-shaft tube is designed to form a continuous channel with the intention that cabling be configured to extend through the channel, through the wrist housing, and up to the tilt to be secured to the turn disc. At least one section of the cabling extending through the drive-shaft tube is secured to the drive-shaft tube and accompanies the movement of the drive-shaft tube.

The wrist unit according to the invention is arranged at the outer end of a robot upper arm. The solution makes possible internally drawn cabling through the upper arm and wrist, thus eliminating the problems of externally swinging cabling. This permits the industrial robot to be capable of being simulated in a virtual computer environment, which is a requirement for present-day industrial robots. Further, the invention permits the external total turn radius of the robot, capable of being simulated, to become considerably smaller, relatively seen, than if the process cabling had been arranged externally of the robot.

The industrial robot according to the invention enables a separation of the movement of the cabling in the wrist unit with respect to rotational movement and bending movement. According to the inventive concept, the cabling, in a first section through the wrist housing, is subjected to bending only. Further, in a second section of the cabling, before the drive-shaft tube as viewed from the third axis of rotation, the cabling is subjected at least to rotation. How this is done will be described in the following.

It is part of the inventive concept that the turn disc is driven synchronously with a drive-shaft tube and that the cabling is part of the drive-shaft tube and follows it synchronously. The cabling runs freely for bending in the wrist centre, and the synchronous rotational movement is diverted in the lateral direction. The synchronous rotational movement to the turn disc is led via a laterally placed drive shaft outside the wrist centre. The temporary gear ratio is recompensated. The synchronous rotational movement is led back in through the centre of rotation of the fifth axis of rotation to the tilt housing via a bevel gear pair which also intercepts the cabling again. The temporary gear ratio is thus recompensated. The cabling is again fixed to the synchronous rotational movement via the bevel gear pair and hence to the turn disc. A robot tool, which is attached to the centre of the turn disc, is thus driven synchronously by the drive-shaft tube. The gear ratio for the sixth axis of rotation is 1:1 synchronously through the wrist from the drive-shaft tube to the turn disc and similarly in the reverse direction from the turn disc to the drive-shaft tube. All gear ratio between the drive means and the turn disc takes place in the robot arm or in the wrist housing before the drive-shaft tube. The compensation causes also the cabling to be controlled by force together with the turn disc.

All cabling movement takes place synchronously between the drive-shaft tube and the turn disc or in the reverse order.

If the sixth axis of rotation is to be rotated across a stationary fifth axis of rotation, the rotational movement takes place synchronously. If the fifth axis of rotation rotates, the control system compensates for the distortion that tends to arise in the sixth axis of rotation. Since the rotational movement is led back synchronously, the control system senses the distortion as undesired and then compensates for this such that the forced distortion of the sixth axis of rotation is counteracted, that is, never arises. The synchronous feedback returns the rotation synchronously for the sixth axis of rotation across the rotation of the tilt about the fifth axis of rotation together with the rotation for the fourth axis of rotation.

The solution makes it possible to minimize the total length of a wrist, to fulfil its need of functional dimensions and, in addition, to fulfil the need of the process cabling for bending and rotation across the bearing of the tilt across the fifth axis of rotation. The solution is based on a separation of simultaneous functions by returning the rotation synchronously for the sixth axis of rotation in the turn disc back across the rotation of the tilt about the fifth axis of rotation to take place together with the rotation for the fourth axis of rotation. The centre of the wrist unit is hence free for process cabling where there is normally a bevel gear pair for the gear ratio of the fifth axis of rotation.

It is part of the inventive concept that the first drive means should be arranged either in the robot arm or in the wrist unit. It is also part of the inventive concept that the second drive means should be arranged either in the robot arm or in the wrist unit. In an advantageous embodiment of the invention, both the first and second drive means are arranged inside, or outside, the robot arm.

It is part of the inventive concept to arrange the process cabling of a robot to extend through a centrally located cavity with an extent through the whole upper arm of robot, said upper arm comprising a concentric orientation of the fourth and sixth axes of rotation. This enables the cabling to easily reach further into the wrist, which thus constitutes a service-friendly, fast and easily replaceable unit. In the wrist the centrally located cavity then continues and changes into a symmetrical wrist with no offset for the axis of rotation of the turn disc. Hence, an advantageous symmetrical movement pattern is obtained in the wrist.

The embodiment of the wrist unit according to the invention, with a continuous channel through the wrist housing and further up to the turn disc, allows space for process cabling configured to extend through the channel. It is part of the inventive concept that, for example, only process cabling as defined above is configured to extend through the robot arm and the wrist unit, respectively. The remaining parts of the cabling are, for example, configured to be wound on the outer casing of the process cabling.

The solution according to the second aspect of the invention is to provide a method in an industrial robot with a control system and a manipulator which comprises a robot arm and a wrist unit arranged on the robot arm. The wrist unit comprises a wrist housing arranged for rotation about a fourth axis and a wrist part/tilt pivotally journalled in the wrist housing for rotation about a fifth axis of rotation. A turn disc rotatably journalled on the wrist part/the tilt is arranged for rotation about a sixth axis of rotation where the sixth axis of rotation is configured to cross the fifth axis of rotation. Further, the wrist housing comprises a first transmission configured to transmit rotation from a first drive unit to the turn disc for rotation about the fifth axis of rotation and a second transmission configured to transmit rotation from a second drive unit to the turn disc about the sixth axis of rotation where the control system controls the first and second drive units. The control system is brought to control the first and second drive units, respectively, such that the gear ratio between a drive-shaft tube, symmetrically arranged in the first transmission, and the turn disc is 1:1.

The robot wrist according to the invention allows a synchronous torque transmission of the rotational movement of the cabling from the turn disc back to the tubular shaft to achieve a separation of the requirements for simultaneous bending and rotation. The method according to the invention makes it possible to control the first and second drive means to rotate the first and second transmissions, respectively, for simultaneous rotation of the turn disc about the fifth and sixth axes of rotation, respectively, and at the same time to compensate such that the part of the cabling that extends through the wrist is subjected to bending only.

This eliminates the need of a recompensating torque transmitter, which is part of the known technique. Hence, without a torque transmitter, it is possible to provide a—relatively seen—considerably smaller wrist unit.

It is part of the inventive concept to use straight gears also in the first stage. They are less expensive and easy to install and eliminate the need of shimming.

BRIEF DESCRIPTION OF THE DRAWINGS

The invention will be explained in greater detail, by description of embodiments, with reference to the accompanying drawings, wherein.

DESCRIPTION OF THE PREFERRED EMBODIMENTS

Figure 1:
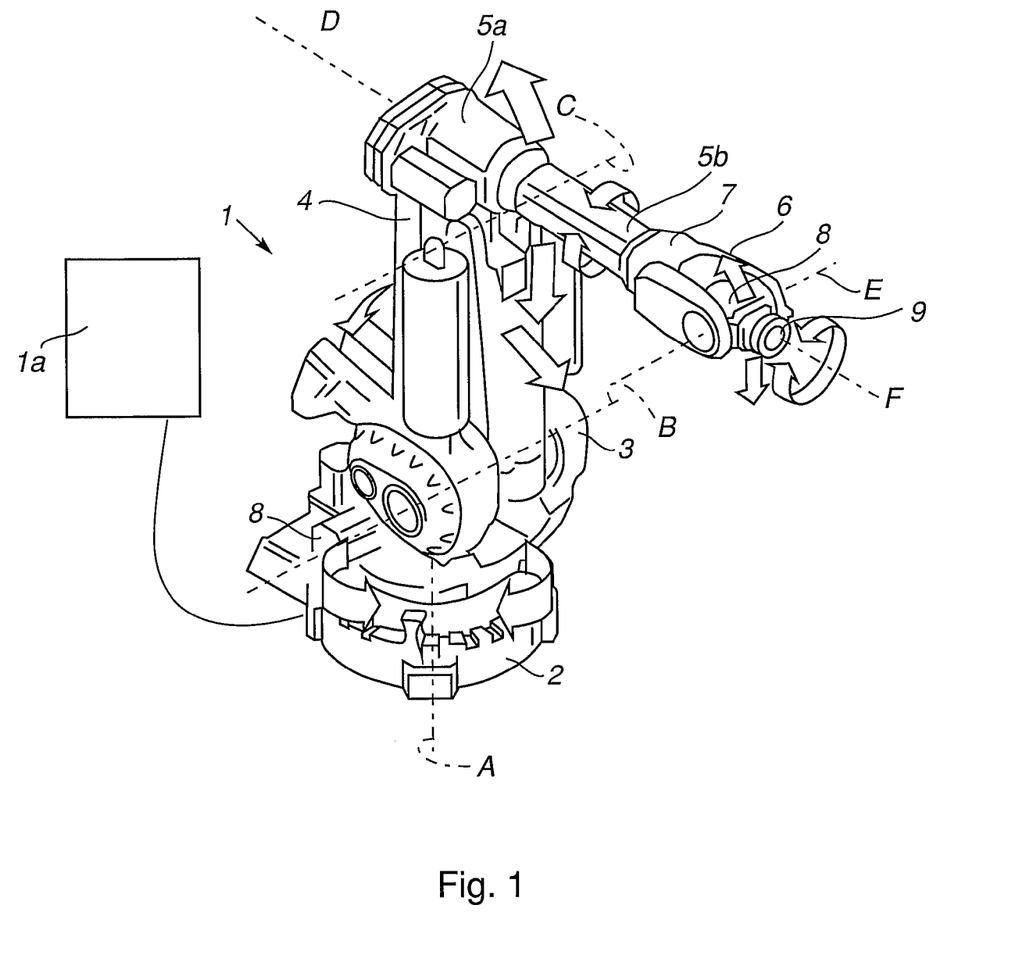
FIG. 1 is a six-axis industrial robot.

An industrial robot comprises a control system, a manipulator and electric motor units configured to attend to the movements of the manipulator. Each motor unit comprises an electric motor, a brake and a drive means and transmits rotational movements to the manipulator. FIG. 1 shows a six-axis industrial robot 1 with a foot 2, which is mounted against a base. The robot further comprises a stand 3, which is rotatable in relation to the foot 2 about a first axis of rotation A. In the stand 3, a first robot arm 4 is rotatably journalled for rotation about a second axis of rotation B. The industrial robot shown further comprises a second robot arm 5, which is rotatably journalled in the outer end of the first robot arm for rotation about a third axis of rotation C. The second robot arm 5 comprises two parts, an inner part 5a and an outer part 5b, whereby the outer part 5b is rotatable in relation to the inner part 5a about a fourth axis of rotation D which coincides with the longitudinal axis of the second arm. A wrist unit 6 is arranged at the outer end of the second robot arm 5 and comprises a wrist housing 7, which is supported by the outer part 5b of the second robot arm. The wrist part further comprises a wrist part 8, here designated tilt, journalled in the wrist housing 7. The tilt 8 is rotatably journalled in the wrist housing 7 for rotation about a fifth axis of rotation E. A turn disc 9 is arranged on the tilt for rotation about a sixth axis of rotation F. The manipulator is connected to a control system 1a.

Figure 2:
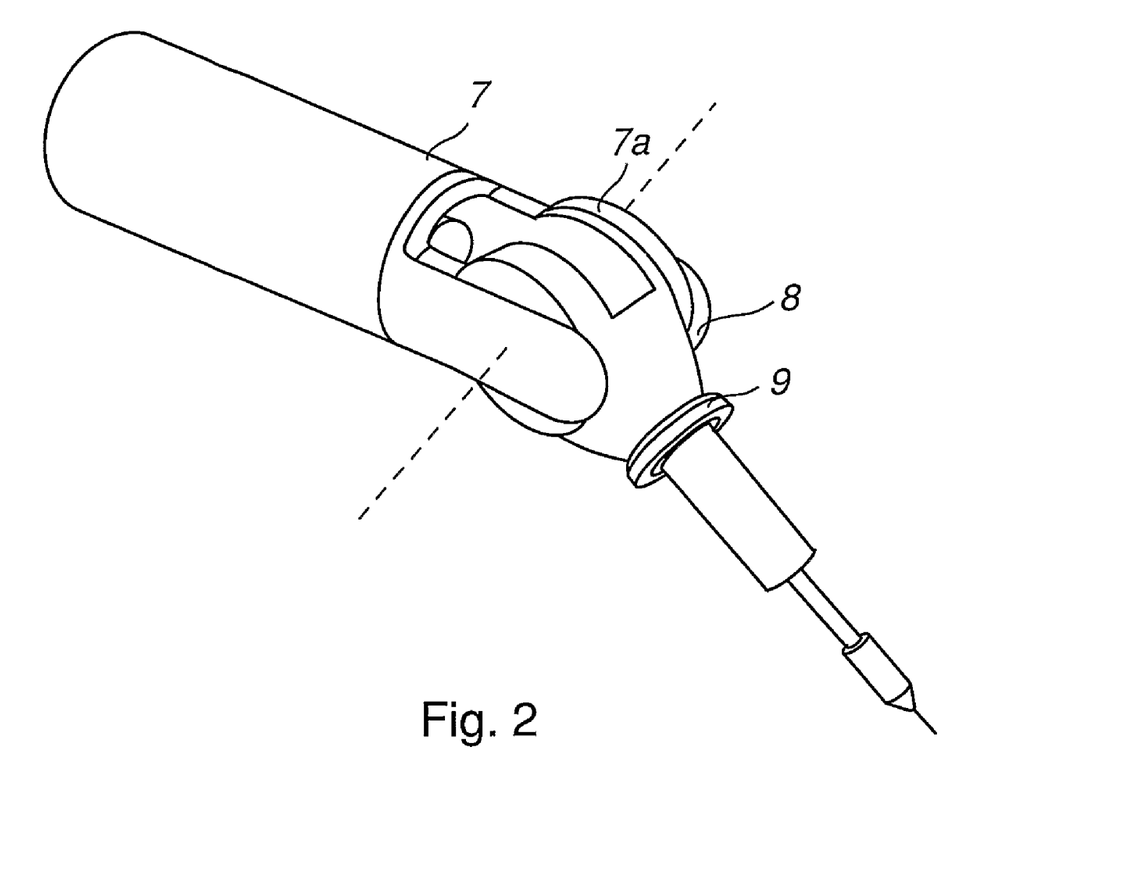
FIG. 2 is a wrist unit, according to the invention, with a double-bearing tilt.

FIG. 2 is a wrist unit 6 comprising a wrist housing 7 and a wrist part/tilt 8. The tilt 8 is rotatably journalled in a fork-like part 7a of the wrist housing 7 for rotation about a fifth axis of rotation E. A turn disc 9 is arranged on the tilt for rotation about a sixth axis of rotation F. The wrist part constitutes a module that is intended to be connected to a robot arm. The wrist housing is formed with a preselected length l, which is chosen, among other things, with regard to the robot application in question and the location of one or more drive means which transmit rotation to the first and second transmissions.

Figure 3:
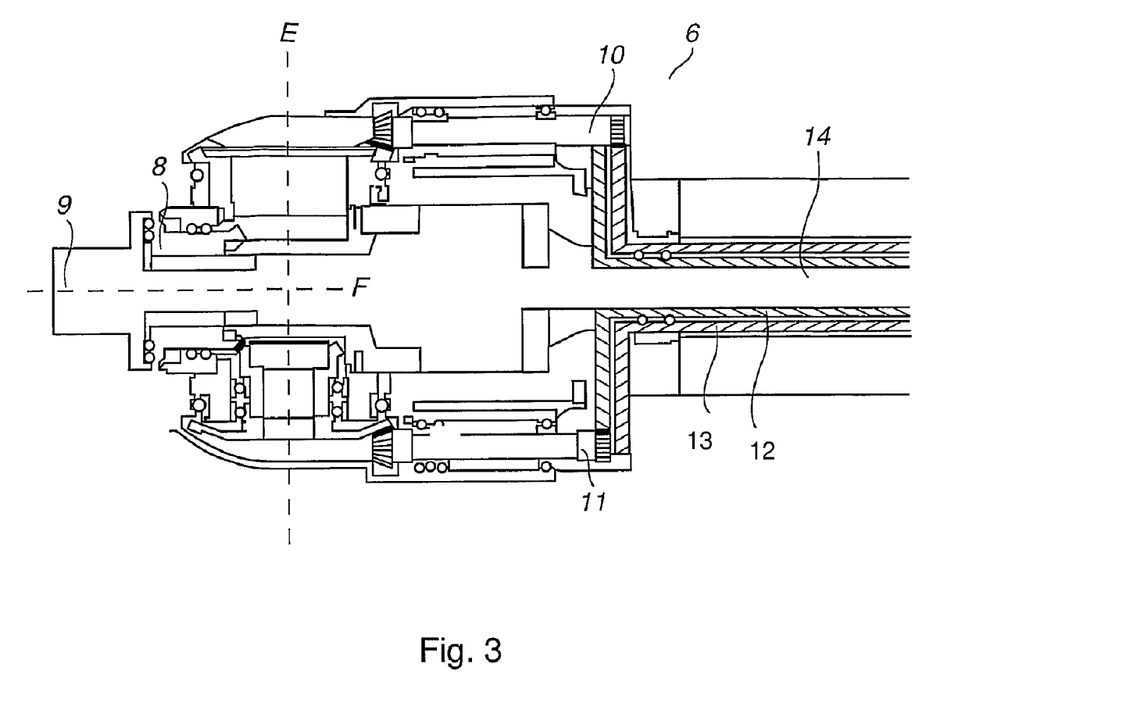
FIG. 3 is a longitudinal section through the wrist unit of FIG. 2.

FIG. 3 is a wrist unit where the fifth axis of rotation E and the sixth axis of rotation F cross each other at right angles. A first transmission 10 transmits rotation to the tilt 8 for rotation about the fifth axis E. A second transmission 11 transmits rotation to the turn disc 9 for rotation about the sixth axis F. The first transmission 10 comprises a first drive-shaft tube 13 and the second trans-mission 11 comprises a second drive-shaft tube 12. The first 13 and second 12 drive-shaft tubes are arranged symmetrically and coaxially inside each other along the symmetry axis G of the wrist housing. The first 13 and second 12 drive-shaft tubes are arranged in the wrist housing with an extent in the longitudinal direction which does not exceed the length l of the wrist housing (see FIG. 2). The second drive-shaft tube 12 is arranged farthest in and forms an inner continuous channel 14 in the wrist housing. The first 13 and second 12 drive-shaft tubes are arranged offset in relation to the wrist centre The second transmission 11 comprises a second drive-shaft tube 12 provided with a first gear ring 15, which is arranged in driving engagement with a second gear ring 17 arranged at one end 16a of a rotatably journalled first drive shaft 16 (see FIG. 4). The second end 16b of the first drive shaft is provided with a third gear ring 18, which has a conical shape. The third gear ring is arranged in driving engagement with a fourth gear ring 19, which has a conical shape and is arranged at one end 20a of a rotatably arranged shaft 20. In the longitudinal direction the shaft 20 is arranged to be coaxial with the axis of rotation E and, at its other end 20b, supports a fifth gear ring 21. The fifth gear ring has a conical shape and is arranged in driving engagement with a sixth gear ring 22 arranged on the tilt 8. The sixth gear ring 22 is driven to rotate about its symmetry axis, which consists of an axis of rotation F and hence the tilt 8 rotates together with the turn disc 9 about the axis of rotation F.

The first transmission 10 comprises a first drive-shaft tube 13 provided with a seventh gear ring 23, which is arranged in driving engagement with an eighth gear ring 24 arranged at one end 25a of a rotatably journalled second drive shaft 25. The second end 25b of the second drive shaft is provided with a ninth gear ring 26, which has a conical shape. The ninth gear ring 26 is arranged in driving engagement with a tenth gear ring 27, which has a conical shape and is arranged at one end 28a of a rotatably arranged shaft 28. In the longitudinal direction the shaft 28 is arranged to be coaxial with and driven to rotate about the axis of rotation E, and hence the tilt 8 is moved/rotated about the axis of rotation E.

Figure 4:
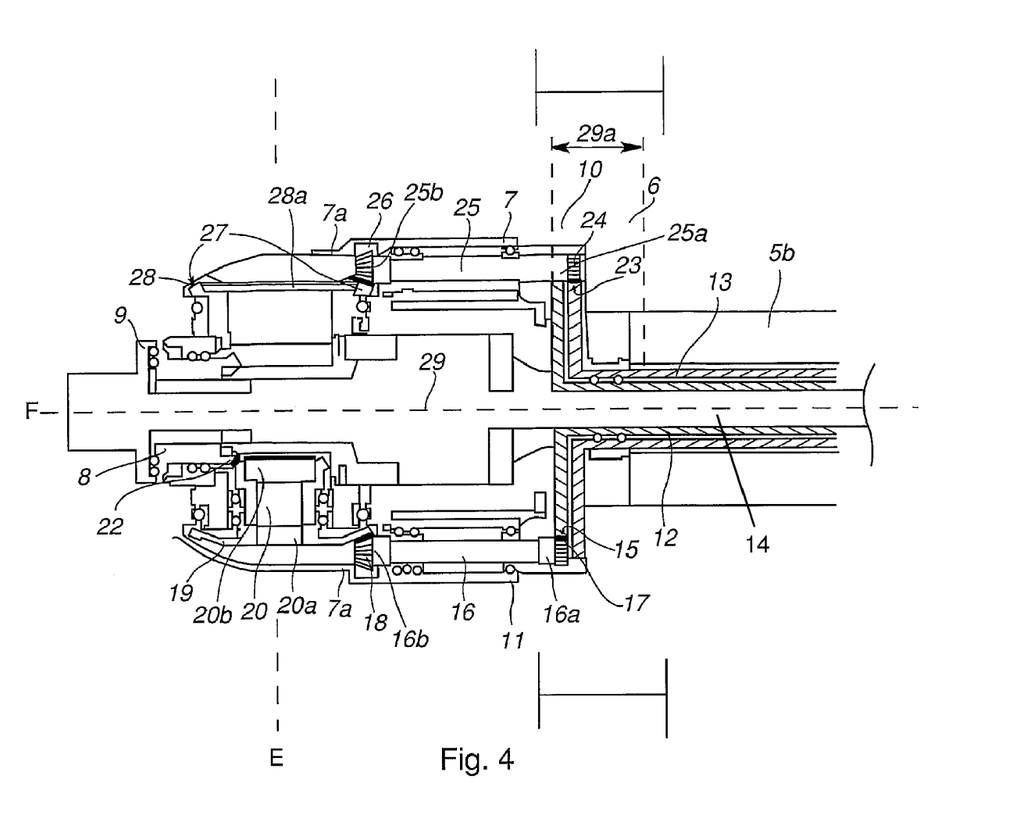
FIG. 4 is a wrist unit according to FIG. 3, provided with cabling, FIG. 5a are two embodiments with drive means arranged, respectively, outside and inside a robot arm according to FIG. 1, FIG. 5b are two embodiments with drive means arranged, respectively, outside and inside a wrist unit according to FIGS. 2-4.

FIG. 4 is a wrist unit according to FIG. 3, provided with cabling 29. The cabling emanates from and is drawn through at least part of the outer part 5b of the robot arm 5, and further through the second drive-shaft tube 12. At least along a section 29a, the cabling 29 is fixed to the first drive-shaft tube 12 for simultaneous rotation with the drive-shaft tube. Further, the cabling 29 is configured to extend through the fork-like part 7a of the wrist housing 7 and is further drawn up to and fixed to the turn disc 9.

Figure 5A:
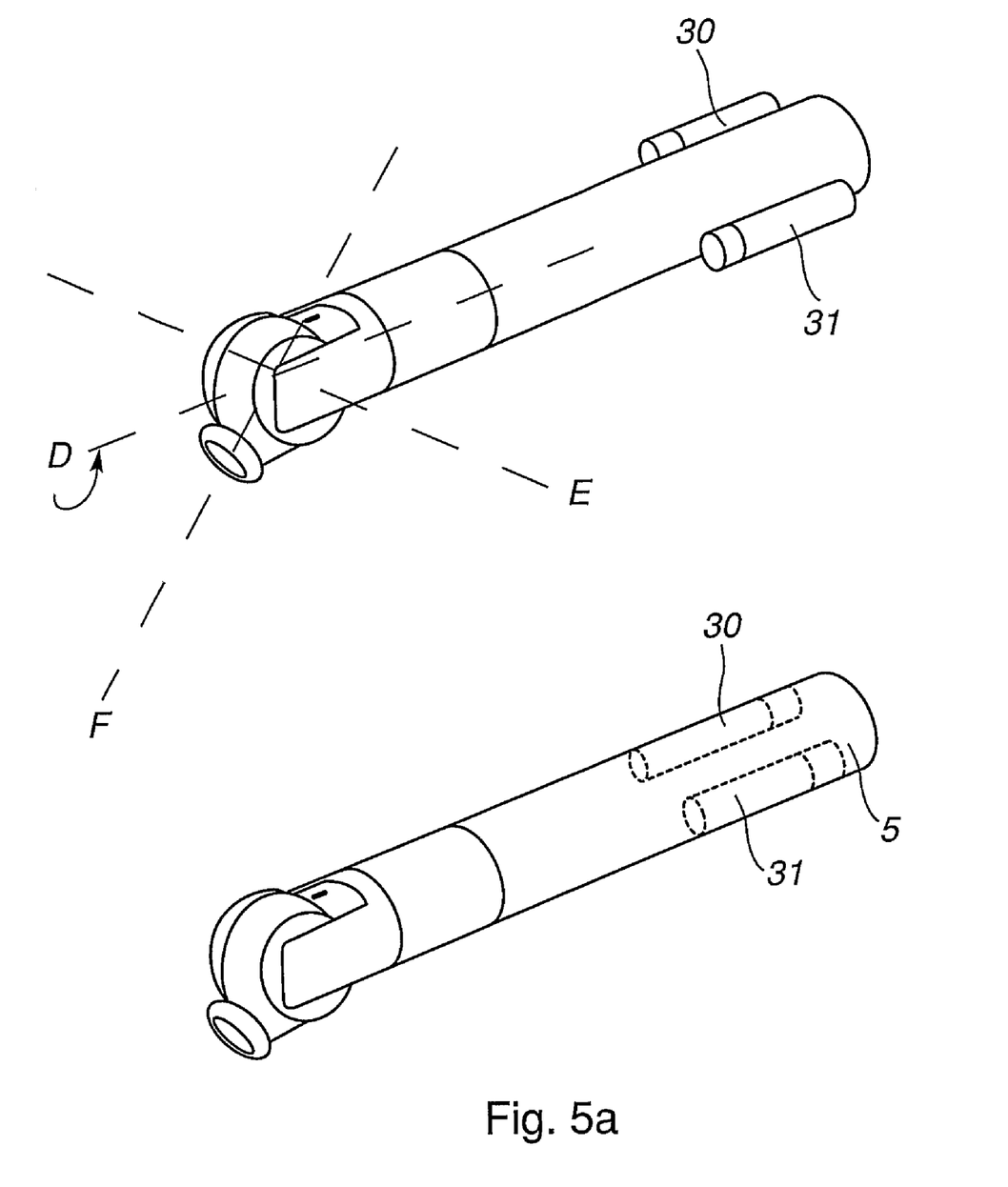
Figure 5B:
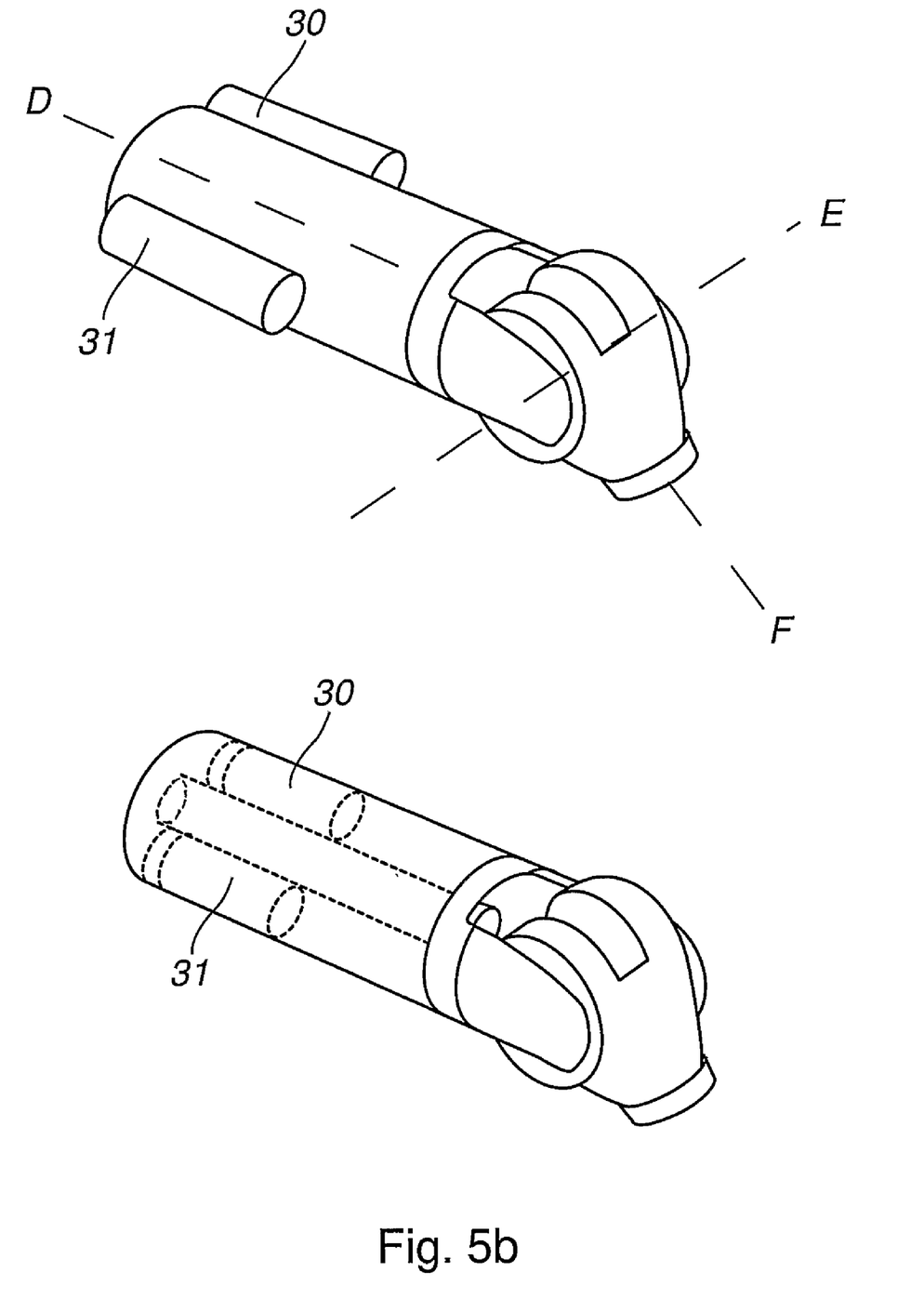

A first drive means 30 is arranged for driving the first drive-shaft tube 13 in the first transmission 10 and a second drive means 31 is arranged for driving the second drive-shaft tube 12 in the second transmission 11. FIG. 5a shows two embodiments where the first and second drive means, 30 and 31, are arranged, respectively, on and inside the robot arm 5. FIG. 5b shows alternative embodiments where the first and second drive means 30 and 31 are arranged, respectively, on and inside that part of the wrist unit which is closest to the robot arm 5.

In an industrial robot according to FIG. 1, arranged with a wrist unit 6 according to FIGS. 2-4 and cabling according to FIG. 4, the following method is made possible according to the invention. In a wrist part according to FIG. 4, a rotation of the second drive-shaft tube 12 leads to the cabling 29 also being rotated. The same rotation causes that part of the cabling, which extends through the fork-like wrist housing and up to the turn disc 9, to be rotated as well. The movement of the second drive tube 12 is transmitted through the second transmission 11 to the turn disc 9. The cabling 29 is fixed to the turn disc 9 and both the movement of the cabling 29 and the movement of the turn disc 9 occur synchronously since the gear ratio is configured to be 1:1. There is no gear ratio in the movement and hence no difference in movement.

Upon simultaneous movement about the axes E and F, the control system carries out a compensation that is based on experience. The system knows how a rotation about the E-axis leads to rotation about the F-axis due to the fact that the fifth and sixth gear rings are connected in a driving manner. The control system is designed to compensate for the rotation about the E-axis, whereby the cabling between the drive-shaft tube and the turn disc in all positions is subjected to pure bending only. The rotational movement is absorbed in that part of the cabling which is located between the drive-shaft tube 12 and the robot arm 5 where the cable is thus distorted.

Figure 6:
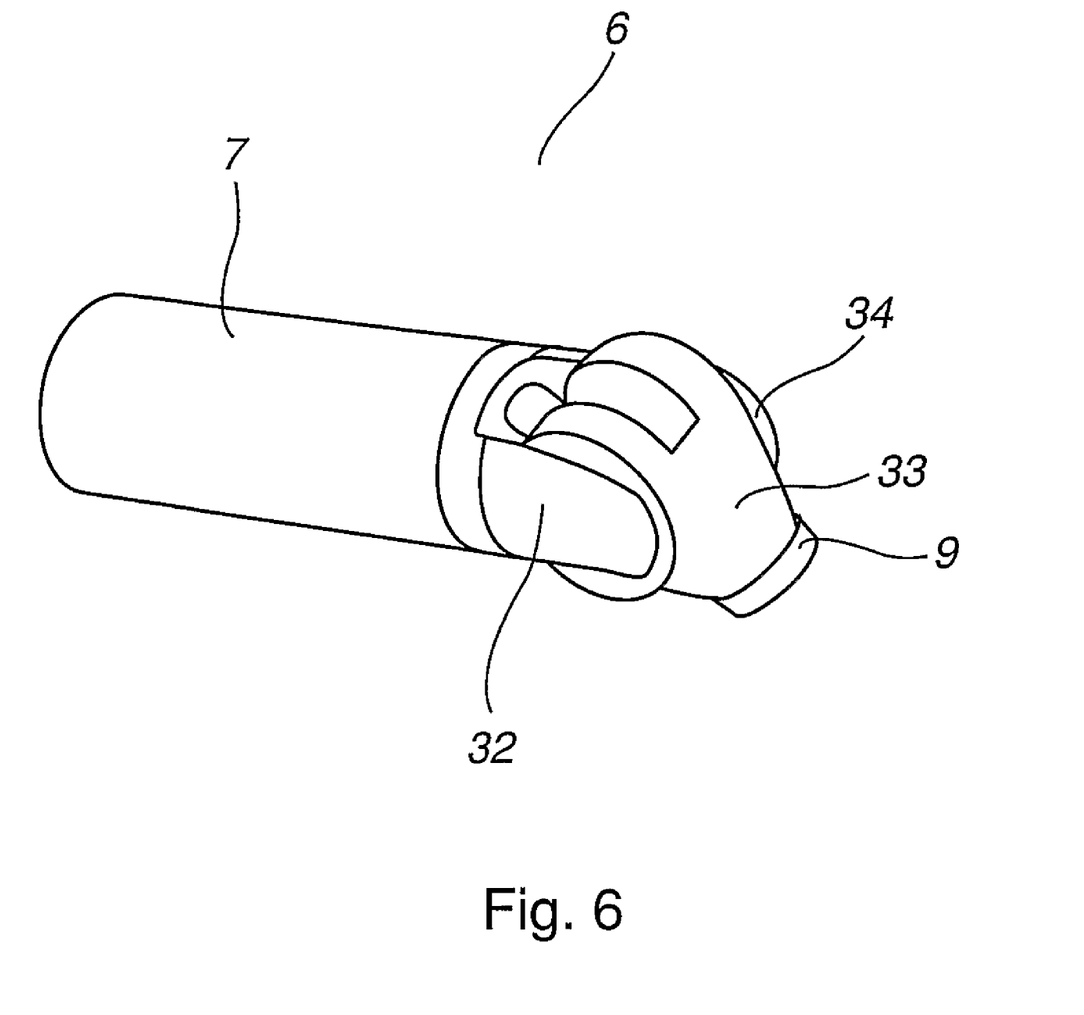
FIG. 6 is a schematic view of a single-bearing tilt.

FIG. 6 is a schematic view of a wrist unit according to the invention, with a tilt suspended by means of a single bearing. Two bevel gear pairs (not shown) configured to act in each other provide a single-bearing arrangement 32 of a tilt 33. The wrist housing is provided with a supporting bearing 34 for the tilt 33.

Figure 7A:
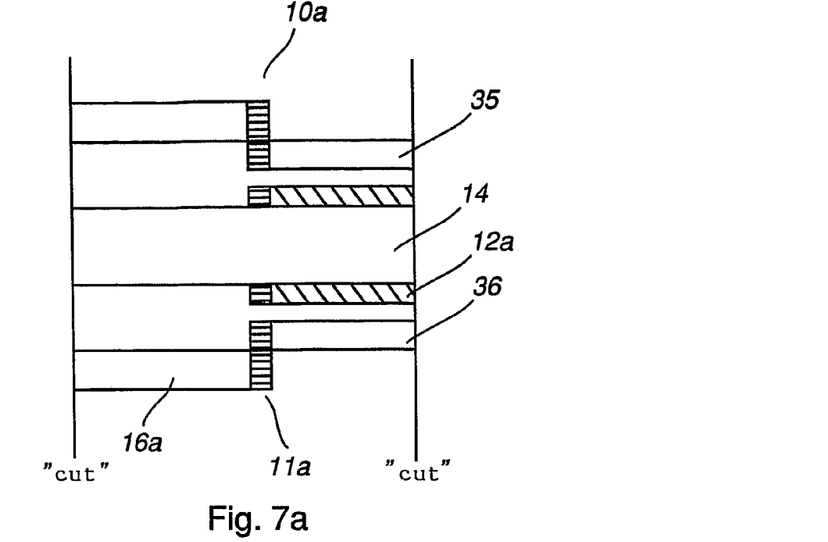
FIGS. 7a and 7b show alternative transmission solutions in a wrist unit according to FIG. 4.

FIG. 7a schematically shows an alternative transmission solution in a wrist unit according to FIG. 4. A first transmission 10a comprising a drive shaft 35 arranged to be parallel and eccentric in relation to cabling 14 extending through the wrist, in accordance with FIG. 4, is configured to transmit rotation about axis E. A second transmission 11a comprising a drive shaft 36 arranged to be parallel and eccentric in relation to cabling 14 extending through the wrist, in accordance with FIG. 4, is configured to transmit rotation about axis F. The drive shaft 36 transmits rotation to both drive shaft 16a and drive-shaft tube 12a.

Figure 7B:
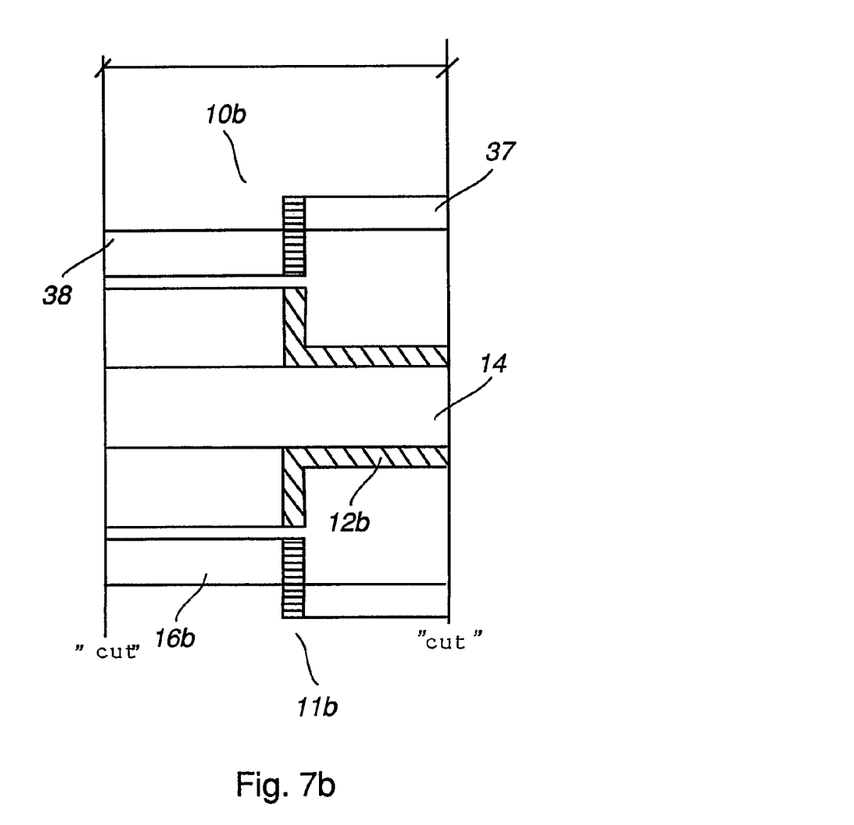

FIG. 7b schematically shows an alternative transmission solution in a wrist unit according to FIG. 4. A first transmission 10b comprising a drive shaft 37 arranged to be parallel and eccentric in relation to cabling 14 extending through the wrist, in accordance with FIG. 4, is configured to transmit rotation about axis E. A second trans-mission 11*b* comprises a drive-shaft tube 12*b* arranged in accordance with FIG. 4 and is configured to transmit rotation about axis F. The drive-shaft tube 12*b* transmits rotation to drive shaft 16*b*. It should be pointed out that FIGS. 7*a* and 7*b* only show solutions in principle. FIGS. 7*a* and 7*b* do not show optimal dimensions of the parts included.

The solutions in FIGS. 7*a* and 7*b* make possible an alternative location of the motors, for example located at an angle of 90 degrees in relation to the symmetry line/axis of rotation D of the upper arm.

The invention claimed is:

1. A wrist unit, intended to be connected to a robot arm in an industrial robot, the wrist unit comprising:
   a wrist housing,
   a wrist part forming a tilt pivotally journalled in the wrist housing for rotation about an axis of rotation of the tilt,
   a turn disc rotatably journalled in the tilt for rotation about an axis of rotation of the turn disc, wherein the axis of rotation of the turn disc is configured to be perpendicular to the axis of rotation of the tilt,
   a first transmission configured to transmit rotation to the tilt about the axis of rotation of the tilt, and
   a second transmission configured to transmit rotation to the turn disc about the axis of rotation of the turn disc, wherein the second transmission comprises a drive-shaft tube arranged symmetrically along the symmetry axis of the wrist housing, the drive-shaft tube is configured to form a continuous channel, the channel is configured to receive and accommodate continuous cabling.

2. The wrist unit according to claim 1, further comprising:
   at least one drive means arranged for driving one of the transmission.

3. A robot arm comprising a module in the form of a wrist unit according to claim 1.

4. The wrist unit according to claim 1, wherein the tilt is journalled in double-sided bearings.

5. The wrist unit according to claim 1, wherein the tilt is journalled in a single-sided bearing.

6. An industrial robot, comprising:
   a control system and
   a manipulator comprising a robot arm and a wrist unit, arranged on the robot arm, said wrist unit comprising a wrist housing arranged for rotation about an axis of rotation of the wrist housing, a wrist part forming a tilt pivotally journalled in the wrist housing for rotation about an axis of rotation of the tilt, and a turn disc rotatably journalled in the tilt for rotation about an axis of rotation of the turn disc, wherein the axis of rotation of the turn disc is configured to be perpendicular to the axis of rotation of the tilt, the wrist housing further comprising a first transmission configured to transmit rotation from a first drive means to the tilt for rotation about the axis of rotation of the tilt, and a second transmission configured to transmit rotation from a second drive means to the turn disc for rotation about the axis of rotation of the turn disc, wherein the second transmission comprises a drive-shaft tube arranged symmetrically along the axis of rotation of the wrist housing, the drive-shaft tube is configured to form a continuous channel, and wherein cabling is arranged drawn through the channel, through the tilt and is secured to the turn disc.

7. The industrial robot according to claim 6, wherein the robot arm comprises at least one drive means.

8. The industrial robot according to claim 6, wherein the drive means are arranged inside the robot arm.

9. The industrial robot according to claim 6, wherein the drive means are arranged on the robot arm.

10. The industrial robot according to claim 6, wherein the wrist unit comprises at least one drive means.

11. A method in an industrial robot with a control system and a manipulator comprising a robot arm, the method comprising:
   providing a wrist unit, arranged on the robot arm, said wrist unit comprising a wrist housing arranged for rotation about an axis of rotation of the wrist housing that is parallel to a longitudinal axis of the robot arm,
   providing a wrist part forming a tilt pivotally journalled in the wrist housing for rotation about an axis of rotation of the tilt,
   providing a turn disc rotatably journalled in the tilt for rotation about an axis of rotation of the turn disc, wherein the axis of rotation of the turn disc is configured to perpendicular to the axis of rotation of the tilt,
   providing a first transmission configured to transmit rotation from a first drive unit to the tilt for rotation of the tilt about the axis of rotation of the tilt,
   providing a second transmission configured to transmit rotation from a second drive unit to the turn disc for rotation of the turn disc about the axis of rotation of the turn disc, wherein the control system controls the first and second drive units, the method comprising:
   providing a gear ratio of 1:1 between a drive-shaft tube included in the first transmission, and the turn disc,
   pivotally rotating the tilt with the first transmission about the axis of rotation of the tilt, and
   rotating the turn disc with the second transmission about the axis of rotation of the turn disc.

12. The wrist unit according to claim 1, axis of rotation of the tilt is perpendicular to a longitudinal axis of the robot arm.

* * * * *